United States Patent
Ghaziani

(10) Patent No.: US 11,558,744 B2
(45) Date of Patent: Jan. 17, 2023

(54) LOCATION-BASED ASSET USAGE CONTROL

(71) Applicant: SIGNIFY HOLDING B.V., Eindhoven (NL)

(72) Inventor: Mazy Ghaziani, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 399 days.

(21) Appl. No.: 16/592,535

(22) Filed: Oct. 3, 2019

(65) Prior Publication Data
US 2020/0113032 A1 Apr. 9, 2020

Related U.S. Application Data

(60) Provisional application No. 62/741,345, filed on Oct. 4, 2018.

(51) Int. Cl.
| | |
|---|---|
| *H04W 12/08* | (2021.01) |
| *H04L 9/40* | (2022.01) |
| *G06F 21/44* | (2013.01) |
| *G06K 19/07* | (2006.01) |
| *H05B 47/19* | (2020.01) |
| *H05B 47/105* | (2020.01) |
| *G08C 17/02* | (2006.01) |
| *G06F 21/81* | (2013.01) |

(52) U.S. Cl.
CPC ............ *H04W 12/08* (2013.01); *G06F 21/44* (2013.01); *G06F 21/81* (2013.01); *G06K 19/0717* (2013.01); *G08C 17/02* (2013.01); *H04L 63/0876* (2013.01); *H04L 63/0884* (2013.01); *H04L 63/107* (2013.01); *H05B 47/105* (2020.01); *H05B 47/19* (2020.01); *G06F 2221/2111* (2013.01); *G08C 2201/42* (2013.01)

(58) Field of Classification Search
CPC ........ H04W 12/08; G06F 21/44; G06F 21/81; G06F 2221/2111; G06K 19/0717; G08C 17/02; H04L 63/0876; H04L 63/0884; H04L 63/107; H05B 47/19
See application file for complete search history.

(56) References Cited

U.S. PATENT DOCUMENTS

| | | | |
|---|---|---|---|
| 7,152,035 B1 | 12/2006 | Suhy, Jr. | |
| 8,670,381 B1 * | 3/2014 | Houri | G08B 25/00 370/328 |
| 2006/0019645 A1 * | 1/2006 | Azimi | H04M 1/72463 455/419 |
| 2008/0065908 A1 * | 3/2008 | Appaji | G06F 21/82 713/193 |
| 2008/0318548 A1 * | 12/2008 | Bravo | H04L 63/18 455/411 |

(Continued)

*Primary Examiner* — Robert B Leung

(57) ABSTRACT

A lighting device includes a light source configured to emit a light and a sensor configured to receive identification information from an asset tag of a physical asset. The lighting device further includes a processor configured to send the identification information received from the asset tag and location information of the lighting device to a control device. The processor is further configured to receive a usage control message from the control device and transmit the usage control message, where the usage control message controls whether the physical asset is used at a location indicated by the location information.

20 Claims, 7 Drawing Sheets

(56) References Cited

U.S. PATENT DOCUMENTS

| | | | |
|---|---|---|---|
| 2011/0128118 A1 | 6/2011 | Gilleland et al. | |
| 2013/0225197 A1* | 8/2013 | McGregor | G01S 1/68 |
| | | | 455/456.1 |
| 2015/0050922 A1* | 2/2015 | Ramalingam | H04W 4/021 |
| | | | 455/418 |
| 2015/0381658 A1* | 12/2015 | Poornachandran | H04W 12/04 |
| | | | 726/1 |
| 2016/0012196 A1* | 1/2016 | Mark | G06Q 10/00 |
| | | | 705/2 |
| 2016/0056971 A1* | 2/2016 | Kazanchian | H04L 12/282 |
| | | | 340/4.3 |
| 2017/0228566 A1* | 8/2017 | Sengstaken, Jr. | G06K 19/0716 |
| 2018/0196972 A1* | 7/2018 | Lu | H04W 52/0274 |
| 2018/0349651 A1* | 12/2018 | Snediker | H04M 1/04 |
| 2019/0304278 A1* | 10/2019 | Lu | G08B 13/1436 |

* cited by examiner

LOCATION-BASED ASSET USAGE CONTROL

CROSS REFERENCE TO RELATED APPLICATIONS

The present application claims priority under 35 U.S.C. Section 119(e) to U.S. Provisional Patent Application No. 62/741,345, filed Oct. 4, 2018 and titled "Location-Based Asset Usage Control," the entire content of which is incorporated herein by reference.

TECHNICAL FIELD

The present disclosure relates generally to lighting and location-based systems, and more particularly to controlling equipment usage based on location.

BACKGROUND

Location-based systems, such as Real-time Location Systems (RTLS), are used to locate and track assets. For example, an asset tag attached to an asset (e.g., a computer) may transmit a signal that is received by one or more receivers, and the received signal may be used to determine the location of the asset. While determining a location of an asset is useful, in some cases, a person receiving the location information from the one or more receivers may be unable to use the information on time to take any necessary action based on the location information. For example, a person receiving the location information may be unable to prevent unauthorized use of an asset, such as a piece of equipment (e.g., medical equipment, computer, etc.). Thus, in some applications, a solution that allows for controlling use of assets based on location information may be desirable.

SUMMARY

The present disclosure relates generally to lighting and location-based systems, and more particularly to controlling equipment usage based on location. In an example embodiment, a lighting device includes a light source configured to emit a light and a sensor configured to receive identification information from an asset tag of a physical asset. The lighting device further includes a processor configured to send the identification information received from the asset tag and location information of the lighting device to a control device. The processor is further configured to receive a usage control message from the control device and transmit the usage control message, where the usage control message controls whether the physical asset is used at a location indicated by the location information In another example embodiment, a non-transitory computer-readable medium contains instructions executable by a processor. The instructions include receiving identification information from an asset tag of a physical asset and sending location information of a lighting device and the identification information to a control device. The instructions further include receiving a usage control message from the control device and sending the usage control message.

In yet another example embodiment, a system for controlling usage of a physical asset includes a lighting device configured to transmit to a control device location information of the lighting device and identification information received from an asset tag and transmit a usage control message received from the control device. The system further includes the control device, which is configured to transmit to the lighting device the usage control message generated based on the identification information and the location information. The usage control message controls whether the physical asset is used at a location indicated by the location information.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
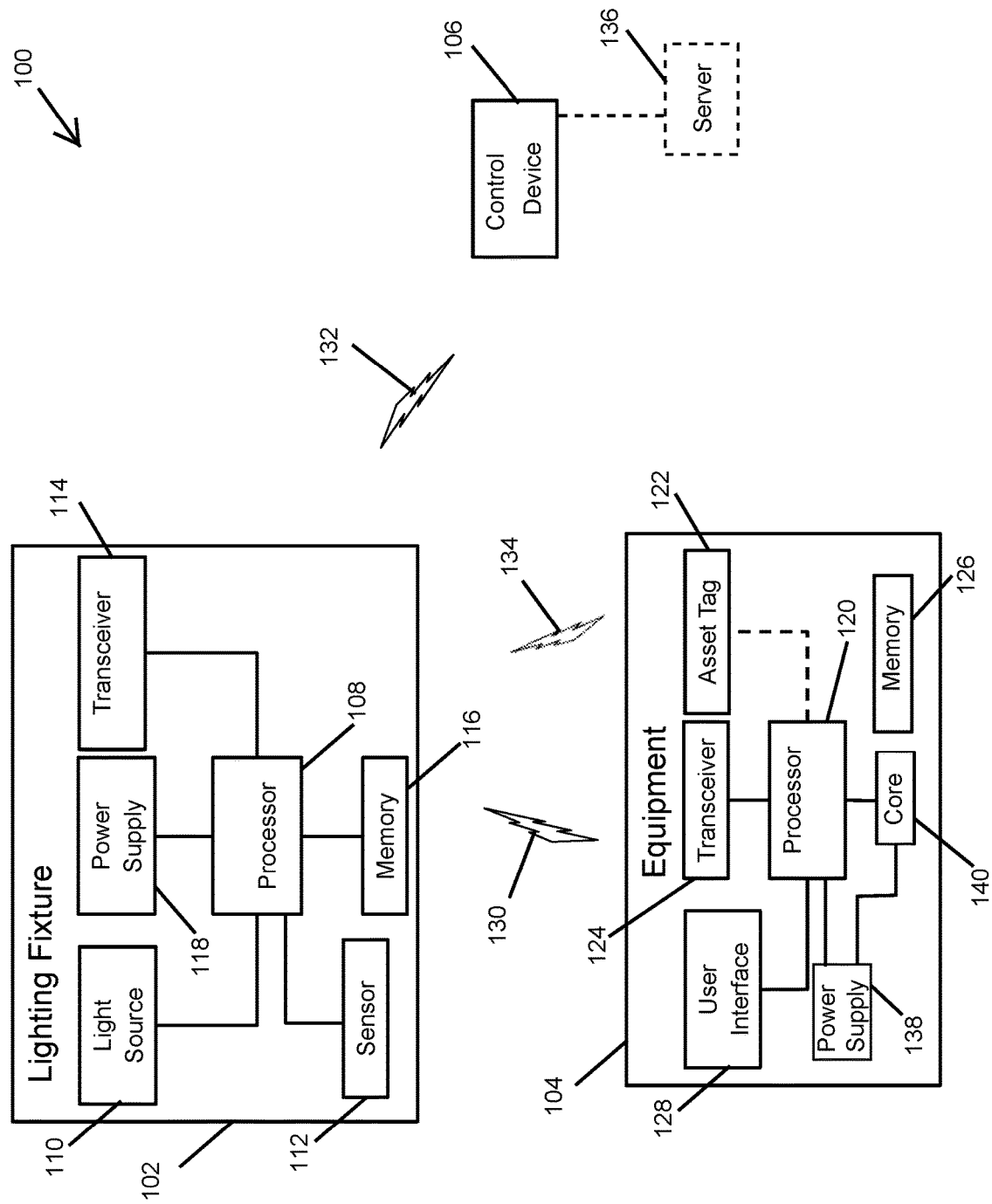
FIG. 1 illustrates a system for controlling usage of a physical asset according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different figures designate like or corresponding, but not necessarily identical elements.

DETAILED DESCRIPTION OF THE EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

Turning now to the figures, particular example embodiments are described. FIG. 1 illustrates a system 100 for controlling usage of a physical asset according to an example embodiment. In some example embodiments, the system 100 includes a lighting device 102, a physical asset 104, and a controller device 106. The lighting device 102 may include a processor 108, a light source 110, a sensor 112, a transceiver 114, a memory device 116, and a power supply 118. The lighting device 102 may communicate with the physical asset 104 using wireless signals 130 that include signals that are compliant with different protocols, and the lighting device 102 may communicate with the control device 106 using wireless signals 132 that include signals that are compliant with one or more protocols.

In some example embodiments, the lighting device 102 may receive, process, and/or transmit information received from the physical asset 104 and from the control device 106. To illustrate, the processor 108 of the lighting device 102 may control operations of the lighting device 102. For example, the processor 108 may process information from the sensor 112 and from the transceiver 114 and may perform operations based on the information. The processor 108 may also control transmissions of information by the transceiver 114. For example, the processor 108 may control the transceiver 114 to transmit to the control device 106 identification information received from an asset tag 122 of the physical asset 104 and location information of the lighting device 102. The processor 108 may also transmit, via the transceiver 114, information identifying the lighting device 102 along with the identification information of the physical asset 104 and the location information of the lighting device 102. For example, information identifying the lighting device 102 may include network identification, serial number, etc.

In some example embodiments, the processor 108 and the transceiver 114 may operate regardless whether the light source 110 is powered on or off. In some alternative embodiments, the processor 108 and the transceiver 114 may operate when the light source 110 is also powered on to emit a light.

In some example embodiments, the processor 108 may control the transceiver 114 to transmit a usage control message to the physical asset 104. For example, the usage control message may be received from the control device 106 via the transceiver 114. To illustrate, the usage control message may indicate whether the physical asset 104 is authorized for use at the location indicated by the location information of the lighting device 102. In some example embodiments, the usage control message may include a command, such as a command to turn on, a command to turn off, a command to enable, a command to disable, etc., for example, the physical asset 104 or one or more components of the physical asset 104.

In some example embodiments, the processor 108 may include a microcontroller/microprocessor and other hardware and software components and may execute software code stored in the memory device 116 to perform operations. The processor 108 may use data (e.g., location information) stored in the memory device 116 in performing the operations and may transmit, via the transceiver 114, data stored in the memory device 116. For example, the memory device 116 may include volatile and non-volatile memory components as can be readily understood by those of ordinary skill in the art with the benefit of this disclosure. The memory device 116 may include multiple memory devices without departing from the scope of this disclosure.

In some example embodiments, the sensor 112 may include a receiver that can receive a wireless beacon signal 134. To illustrate, the sensor 112 may receive a Bluetooth Low Energy (BLE) beacon signal or another beacon signal that includes identification information of a transmitting device (e.g., an asset tag) or of an asset associated with the transmitting device. For example, the sensor 112 may wirelessly receive identification information from the asset tag 122 of the physical asset 104.

In some example embodiments, the transceiver 114 may include one or more receivers and one or more transmitters that can receive wireless signals and transmit, respectively, wireless signals. For example, the transceiver 114 may receive and transmit wireless signals that are compliant with one or more communication standards. To illustrate, the wireless signals received and transmitted by the transceiver 114 may be compliant with an IEEE 802.11 standard, an IEEE 802.15.1 standard, an IEEE 802.15.4 standard, or another standard. For example, the transceiver 114 may receive and transmit wireless signals that are compliant with Wi-Fi, Bluetooth, Bluetooth Low Energy, ZigBee, Thread, and/or a proprietary protocol. In some alternative embodiments, one or more discrete receivers that can receive wireless signals and one or more discrete transmitters that can transmit wireless signals may be used instead of the transceiver 114.

In some example embodiments, the power supply 118 may provide power to the processor 108 and to other components of the lighting device 102. The processor 108 may control the power supply 118, for example, based on information received by the transceiver 114. The processor 108 may also control the light source 110, for example, based on information received by the transceiver 114, information from occupancy and/or other sensors, etc. For example, the light source 110 may provide an illumination light and/or an indicator light (e.g., a direction indictor, exit indicator, etc.), and the processor 108 may control the light source 110 to adjust the illumination and/or indicator lights.

In some example embodiments, the physical asset 104 may include a processor 120, the asset tag 122, a transceiver 124, a memory device 126, and a user interface 128. The physical asset 104 may be a piece of equipment that is typically used in hospitals, schools, businesses, etc. For example, the physical asset 104 may be a medical device (e.g., a dialysis machine, an imaging machine, etc.), a laboratory device (e.g., a microscope), a laptop, a printer, etc. To illustrate, the physical asset 104 may include one or more core components 140 that are used to execute the main functions (e.g., dialysis, imaging, printing, etc.) of the physical asset independently or in combinations of other components (e.g., the processor 120) of the physical asset 104. The physical asset 104 may be powered through a power receptacle (e.g., wall or floor power outlet) that may be controlled, for example, by a relay. Alternatively or in addition, the physical asset 104 may be fully or partially powered by a battery.

In some example embodiments, the processor 120 may control some operations of the physical asset 104. To illustrate, the processor 120 may include a microcontroller/microprocessor and other hardware and software components and may execute software code stored in the memory device 126 to perform operations. The processor 120 may use data stored in the memory device 126 to perform operations and may store data in the memory device 126. For example, the memory device 126 may include volatile and non-volatile memory components as can be readily understood by those of ordinary skill in the art with the benefit of this disclosure. The memory device 116 may include multiple memory devices without departing from the scope of this disclosure.

In some example embodiments, the processor 120 may control the transmission of information by the transceiver 124. The processor 120 may also process information received by the transceiver 124. For example, the processor 120 may process usage control messages transmitted by the lighting device 102 via the wireless signals 130 and may control whether the physical asset 104 is enabled (e.g., powered on) or disabled (e.g., powered off) for use by a user.

In some example embodiments, the processor 120 may receive information from the user interface 128 and may provide information to the user interface 128 for display via the user interface 128. For example, a user may provide inputs to the physical asset 104 via the user interface 128, and the processor 120 may process user-provided information and/or other information and provide one or more messages to the user interface 128 for display. In some alternative embodiments, the user interface 128 may be used as a display interface only (e.g., a display screen, indicator lights, etc.) and may not provide a means for providing an input to the physical asset 104. In some alternative embodiments, the user interface 128 may not operate as a display interface. In some alternative embodiments, the user interface 128 may be omitted without departing from the scope of this disclosure.

In some example embodiments, the asset tag 122 may be a device that is attached to the physical asset 104 or integrated in the physical asset 104. The asset tag 104 may transmit the beacon signal 134, such as a BLE beacon signal or another beacon signal, that includes identification information. For example, the identification information may be known or determined by the system 100 as being associated with the physical asset 104. The asset tag 122 may be battery powered and may periodically transmit the beacon signal. In some example embodiments, the processor 120 may control the transmission of the beacon signal by the asset tag 12. The beacon signal transmitted by the asset tag 122 may be received, for example, by the sensor 112 of the lighting device 102.

In some example embodiments, the transceiver 124 may include one or more receivers and one or more transmitters that can receive and transmit, respectively, wireless signals. For example, the transceiver 124 may receive wireless signals that are compliant with one or more communication standards. The transceiver 124 may also transmit wireless signals that are compliant with one or more communication standards. To illustrate, the transceiver 124 may receive and transmit wireless signals that are compliant with Wi-Fi, Bluetooth, Bluetooth Low Energy, ZigBee, Thread, and/or a proprietary protocol. For example, the wireless signals received and transmitted by the transceiver 114 may be compliant with an IEEE 802.11 standard, an IEEE 802.15.1 standard, an IEEE 802.15.4 standard.

In some example embodiments, the control device 106 may receive information from the lighting system 102 and process the received information to determine whether the physical asset 104 is authorized for use in an area (e.g., a room, a building, etc.) where the lighting device 102 is located. To illustrate, the control device 106 may access data that includes identification information of physical assets associated with one or more locations at which the physical assets may be used. For example, the data may be stored at the control device 106 or at a server 136, such as a local server or a remote server (e.g., a cloud server). The control device 106 (e.g., a processor of the control device 106) may use the stored data to determine whether the received identification information corresponds to a physical asset that is authorized for use at the location indicated by the location information of the lighting device 102 received from the lighting device 102. After determining whether the received identification information is associated with a physical asset that is authorized for use at the indicated location, the control device 106 may transmit to the lighting device 102 a usage control message that can be used to control (e.g., enable and/or disable) the physical asset 104.

During operations of the system 100, the asset tag 122 of the physical asset 104 may transmit identification information that is associated with the physical asset 104. For example, the asset tag 104 may transmit a beacon signal that includes the identification information that may include a name, a number (e.g., a serial number), or a combination thereof of one or both of the physical asset 104 and the asset tag 122. If the physical asset 104 is within the reception range of the lighting device 102, the lighting device 102 may receive the identification information transmitted by the asset tag 122. For example, the sensor 112 may receive the beacon signal that includes the identification information, and the processor 108 may extract the identification information and transmit the identification information and location information of the lighting device 102 to the control device 106.

To illustrate, the controller 108 may use the transceiver 114 to transmit the identification information received from the asset tag 122 and the location information of the lighting device 102 to the control device 106. For example, the location information may include a label (e.g., Zone A, Office, Conference Room, Room 150, etc.) of the area where the lighting device 102 is located. Alternatively, the location information may include location coordinates (e.g., GPS coordinates, local positioning coordinates, etc.) of the lighting device 102 or may include other information that indicates the location of the lighting device 102. The processor 108 may access the location information of the lighting device 120 indicating the location of the lighting device 102 from the memory device 116. For example, the location information may be stored in the memory device 116 of the lighting device 102 during installation or commissioning of the lighting device 102. Alternatively, the processor 108 may receive the location information via the transceiver 114 or another communication interface after commissioning is done. Alternatively, the processor 108 may receive the information from a device (e.g., a GPS device) integrated with the lighting device 102.

In some example embodiments, the control device 106 may receive the identification information and the location information from the lighting device 102 and use both pieces of information to determine whether the physical asset 104, which is associated with the received identification information, is authorized for use at the location (e.g., Zone A, GPS coordinates, local positioning coordinates, etc.) indicated by the location information. The control device 106 may use a database of identification information of physical assets that is associated with one or more locations at which the particular physical assets may be used to determine whether the received identification information corresponds to a physical asset that is authorized for use at the location indicated by the received location information.

For example, the database may include identification information of a first physical asset along with one or more locations at which the first physical asset (e.g., a medical device, a laptop, etc.) may be used and identification information of a second physical asset along with the same of different one or more locations at which the second physical asset (e.g., a medical device, a laptop, etc.) may be used. Alternatively, the database may include locations associated with identification information of physical assets authorized for use at each of the locations. In general, the database may include information that enables the control device 106 to determine whether the received identification information is associated with a physical asset that is authorized for use at the location indicated by the received location information. For example, the database may include information that indicates locations at which a physical asset, such as the asset 104, identified by the received identification information may not be used.

After determining whether the received identification information is associated with the physical asset 104 that is authorized for use at the location of the lighting device 102, the control device 106 may transmit to the lighting device 102 a usage control message that can be used to control (e.g., enable, disable, etc.) the physical asset 104. The lighting device 102 may receive the usage control message from the control device 106 and transmit the usage control message to the physical asset 104. For example, the transceiver 114 of the lighting device 102 may receive the usage control message and pass the message to the processor 108 that transmits the usage control message to the physical asset 104 via the transceiver 114. For example, the usage control message may include identification information of the physical asset 104 to enable the lighting device 102 to transmit the usage control message to the physical asset 104. Alternatively, the usage control message may include information indicating that the usage control message is a response to particular identification information and location information transmitted by the lighting device 102 so that the lighting device 102 associates the usage control message with the physical asset 104 associated with the identification information.

After the physical asset 104 may receive the usage control message from the lighting device 102 and perform one or more operations based on the usage control message. To illustrate, if the usage control message indicates that the physical asset 104 is authorized for use at the location (e.g., Zone A) of the lighting device 102, the processor 120 may enable the physical asset for use by a user. For example, the processor 120 may enable a power supply 138 to provide power that allows the physical asset 104 to be used by a user for its intended purpose (e.g., dialysis, imaging, computation, printing, etc.). To illustrate, the processor 120 may enable the power supply 138 to provide power to the core component 140 that is used in the operations of the physical asset 104. Alternatively or in addition, the processor 120 may enable the power supply 138 to provide power to one or more other components of the physical asset 104 that need to operate for the physical asset 104 to be used for its intended functions. If the usage control message indicates that the physical asset 104 is not authorized for use at the location (e.g., Zone A) of the lighting device 102, the processor 120 may disable the physical asset 104 to prevent use by a user. For example, the processor 120 may control the power supply 138 to turn off or keep off power to the core component 140 and/or other components of the physical asset 104.

In some example embodiments, the control device 106 may communicate with lighting devices, such as lighting fixtures and other devices, including the lighting device 102 that are within up to 100 feet or more. For example, the control device 106 may be in a different area (e.g., a different floor of a building, a different room of a floor of a building, etc.) from the lighting device 102. Alternatively, the control device 106 may be in the same room as the lighting device 102. In some alternative embodiments, the system 100 along with the lighting device 102 and the asset 104 may be implemented using different components and connections without departing from the scope of this disclosure.

In some alternative embodiments, some components of the lighting device 102 may be integrated into a single component without departing from the scope of this disclosure. In some alternative embodiments, the lighting device 102 may be include other components without departing from the scope of this disclosure. In some alternative embodiments, some components of the asset 104 may be integrated into a single component without departing from the scope of this disclosure. In some alternative embodiments, the asset 104 may be include other components without departing from the scope of this disclosure. In some alternative embodiments, the system 100 may include other elements such as other lighting devices, control devices, other physical assets, and other asset tags without departing from the scope of this disclosure. In some alternative embodiments, some components shown in FIG. 1 may be omitted without departing from the scope of this disclosure.

Figure 2:
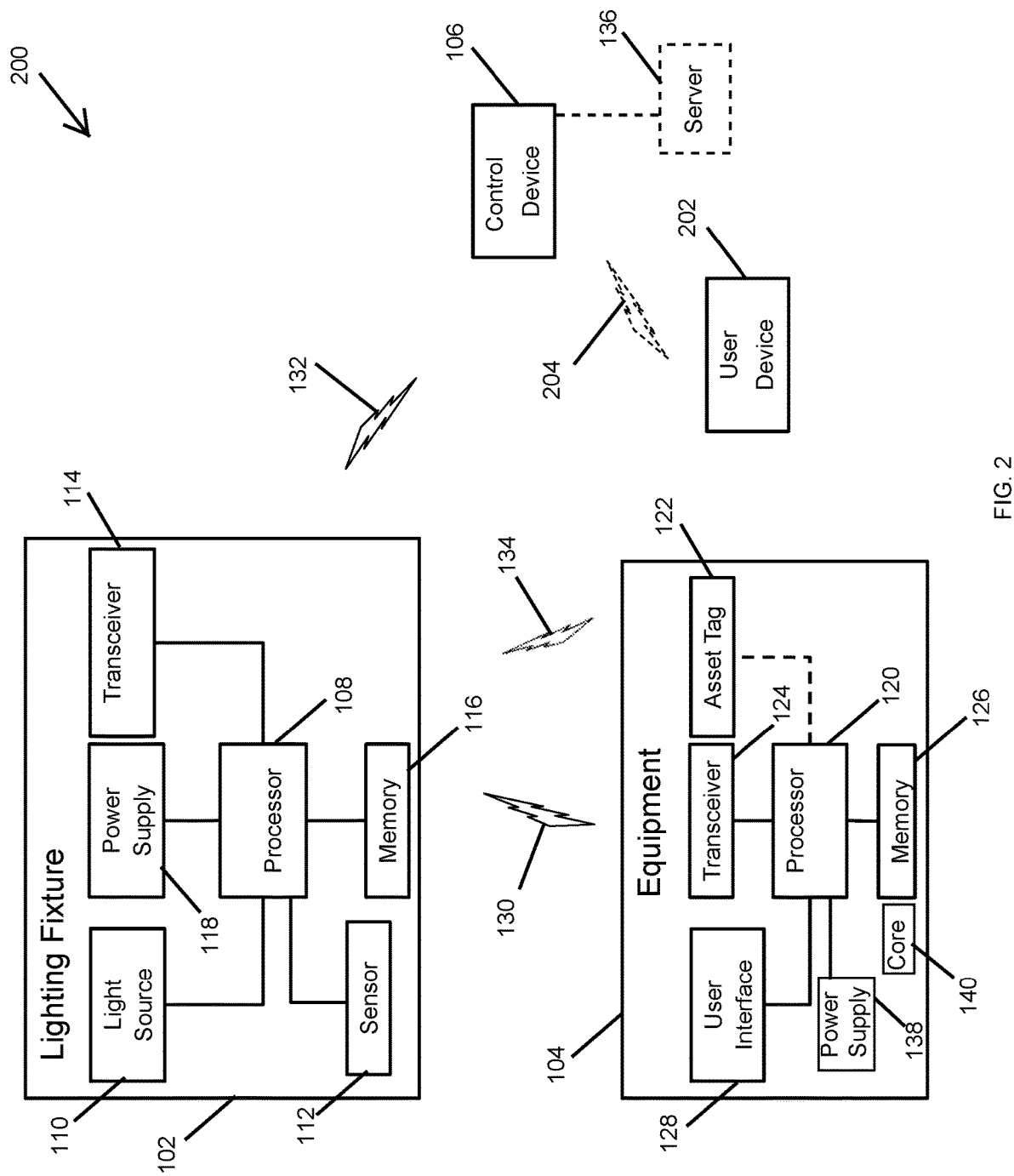
FIG. 2 illustrates a system for controlling usage of a physical asset according to an example embodiment.

FIG. 2 illustrates a system 200 for controlling usage of the physical asset 104 according to an example embodiment. In some example embodiments, the system 200 may operate in a similar manner as the system 100. For example, the system 200 may include the lighting device 102, the physical asset 104, and the control device 106. The asset tag 122 may transmit identification information that is associated with the physical asset 104 to the lighting device 102, and the lighting device 102 may transmit the identification information and location information indicating the location of the lighting device 102 to the control device 106 in a similar manner as described with respect to the system 100.

In some example embodiments, the physical asset 104 may also transmit to the lighting device 102 a user identifier (e.g., a username) provided by a user and prompt the user for a password. To illustrate, the user interface 128 of the physical asset 104 may be used by a user to provide inputs, such as a username, a password, settings, and other inputs, to the physical asset 104, and the processor 120 may process user provided information and/or other information and provide messages to the user interface 128 for display. For example, upon power up or in response to a user providing an input to the physical asset 104 via the user interface or another means, the processor 120 of the physical asset 104 may prompt the user to provide a username via the user interface 128. The processor 120 may receive the username provided by the user to the user interface 128 and transmit the username to the lighting device 102 using the transceiver 124, for example, via one or more of the signals 130. For example, the processor 120 may transmit to the lighting device 102 the username along with information that identifies the physical asset 104.

In some example embodiments, the lighting device 102 may receive the username from the physical asset 104 via the transceiver 114, and the processor 108 may transmit the username to the control device 106 via the transceiver 114, for example, using one or more of the signals 132. For example, the processor 108 may transmit the username to the control device 106 along with the identification information received from the asset tag 122 of the physical asset 104 and the location information of the lighting device 102. Alternatively, the processor 108 may transmit the username to the control device 106 separately but associated with the identification information and the location information of the lighting device 102. The processor 108 may verify that the username is received from the physical asset 104 indicated by the received identification information before transmitting the username and the identification information to the control device 106.

In some example embodiments, the control device 106 may receive from the lighting device 102 the identification information and the location information of the lighting device 102 and determine whether the physical asset 104 is authorized for use at the location of the lighting device 102 in a similar manner as described above. In contrast to the system 100 where the control device 106 sends a usage control message, in the system 200, the control device 106 may send a password in response to determining that the physical asset 104 is authorized for use at the location of the lighting device 102 and that the username is a valid username (e.g., the person associated with the username is authorized to use the physical asset 104). If the control device 106 determines that the physical asset 104 is not authorized for use at the location of the lighting device 102 or that the username is invalid, the control device 106 may send a message indicating so (e.g., to the security personnel, the physical asset 104, etc.) or may not provide any response.

In some example embodiments, the control device 106 transmits the password to the lighting device 102, and the lighting device 102 may receive the password and transmit it to the physical asset 104 and to a user device 202 (e.g., a mobile phone). For example, the control device 106 may transmit the password to the lighting device 102 using one or more of the wireless signals 132, and the lighting device 102 may transmit the password to the physical asset 104 using one or more of the wireless signals 130. The lighting device 102 may transmit the password to the user device 202 using wireless signals compliant with a communication standard, such as Wi-Fi, BLE, etc.

In some alternative embodiments, the control device 106 may transmit the password to the user device 202 using wireless signals compliant with a communication standard, such as LTE, Wi-Fi, BLE, etc. For example, data including usernames of users and associated user device identifiers (e.g., serial numbers, network addresses, device name, etc.) may be stored in the control device 106 or accessible by the control device 106, for example, from the server 136. Upon determining that the username is a valid username and that the physical asset 104 is authorized for use at the location identified by the location information, the control device 106 may transmit the password along with the applicable identifier of the user device 202 to the lighting device 102, and the lighting device 102 may transmit the password using the address. Alternatively, the control device 106 may transmit the password to the user device 202 based on the user device identifier (e.g., network address) associated with the username.

Upon the user device 202 receiving the password from the lighting device 102 or from the control device 106, the user may enter the password via the user interface 128 of the physical asset 104 to unlock or otherwise use the physical asset 104. For example, the processor 120 of the physical asset 104 may compare the password entered by the user via the user interface 128 against the password received by the physical asset 104 from the control device 106 through the lighting device 102. If the passwords match, the processor 120 may unlock or otherwise enable the physical asset 104 for use by the user. If the passwords do not match, the processor 120 may lock, keep locked, or otherwise prevent the use of the physical asset 104 by the user.

In some alternative embodiments, the system 300 may include other elements such as other lighting devices, control devices, other physical assets, and other asset tags without departing from the scope of this disclosure. In some alternative embodiments, some components shown in FIG. 3 may be omitted without departing from the scope of this disclosure.

Figure 3:
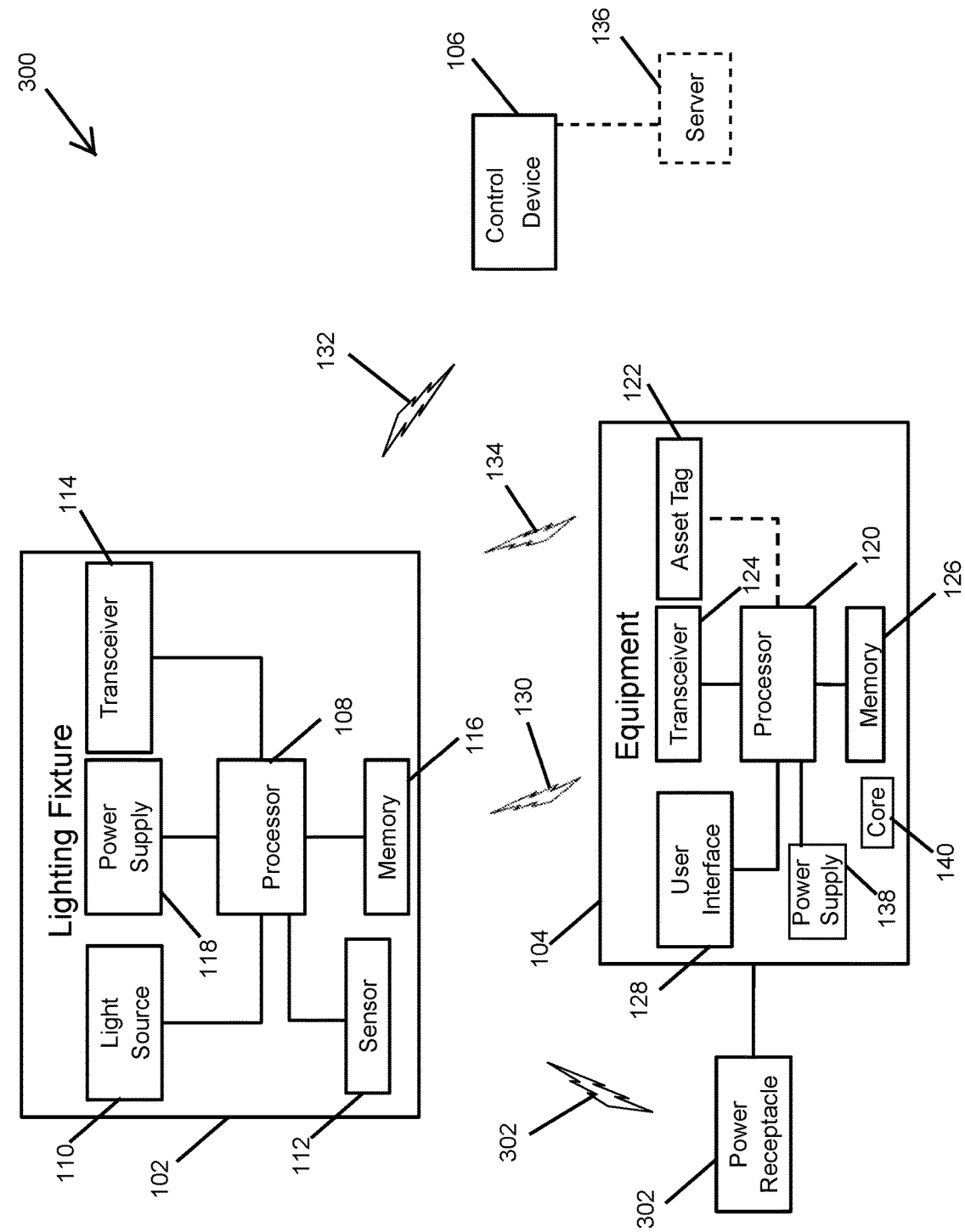
FIG. 3 illustrates a system for controlling usage of a physical asset according to an example embodiment.

FIG. 3 illustrates a system 300 for controlling usage of the physical asset 104 according to another example embodiment. In some example embodiments, the system 300 may operate in a similar manner as the system 100. For example, the system 300 may include the lighting device 102, the physical asset 104, and the control device 106. The asset tag 122 may transmit identification information that is associated with the physical asset 104 to the lighting device 102, and the lighting device 102 may transmit the identification information and location information indicating the location of the lighting device 102 to the control device 106 in a similar manner as described with respect to the system 100.

In some example embodiments, the control device 106 may receive from the lighting device 102 the identification information and the location information of the lighting device 102 and determine whether the physical asset 104 is authorized for use at the location of the lighting device 102 in a similar manner as described above. In the system 300, in response to determining whether the physical asset 104 is authorized for use at the location of the lighting device 102, the control device 106 may send a usage control message that controls whether power is provided to the physical asset 104. For example, the usage control message may be a power control message intended to control a power receptacle 302. As used herein, a power control message can be considered as a type of the usage control message that is intended for controlling the availability of power. In some example embodiments, the power control message may be a command to turn on, turn off, etc. power to the physical asset 104.

For example, if the control device 106 determines that the physical asset 104 is authorized for use at the location of the lighting device 102, the control device 106 may transmit the power control message to allow use of the physical asset 104 at the location by controlling the availability of power at the power receptacle 302. If the control device 106 determines that the physical asset 104 is not authorized for use at the location of the lighting device 102, the control device 106 may send the power control message to disable or otherwise prevent use of the physical asset 104 at the location.

To illustrate, the control device 106 may transmit the power control message to the lighting device 102, and the lighting device 102 may receive the power control message from the control device 106 and transmit the power control message to the power receptacle 302. For example, the physical asset 104 may be plugged into the power receptacle 302 and may be powered by electrical power provided through the power receptacle 302. The electrical power provided to the physical asset 104 through the receptacle 302 may be turned on or off based on the power control message received from the control device 106 through the lighting device 102. For example, a relay that controls the availability of electrical power at the power receptacle 302 may be turned on or off based on the power control message. To illustrate, a controller that controls the relay may receive the power control message and control the relay, directly or indirectly, based on the power control message to control the availability of power at the power receptacle 302.

In some alternative embodiments, the system 300 may include other elements such as other lighting devices, control devices, other physical assets, and other asset tags without departing from the scope of this disclosure. In some alternative embodiments, the lighting device 102 may send the power control message to multiple power receptacles that are within reception range. In some alternative embodiments, some components shown in FIG. 3 may be omitted without departing from the scope of this disclosure.

Figure 4:
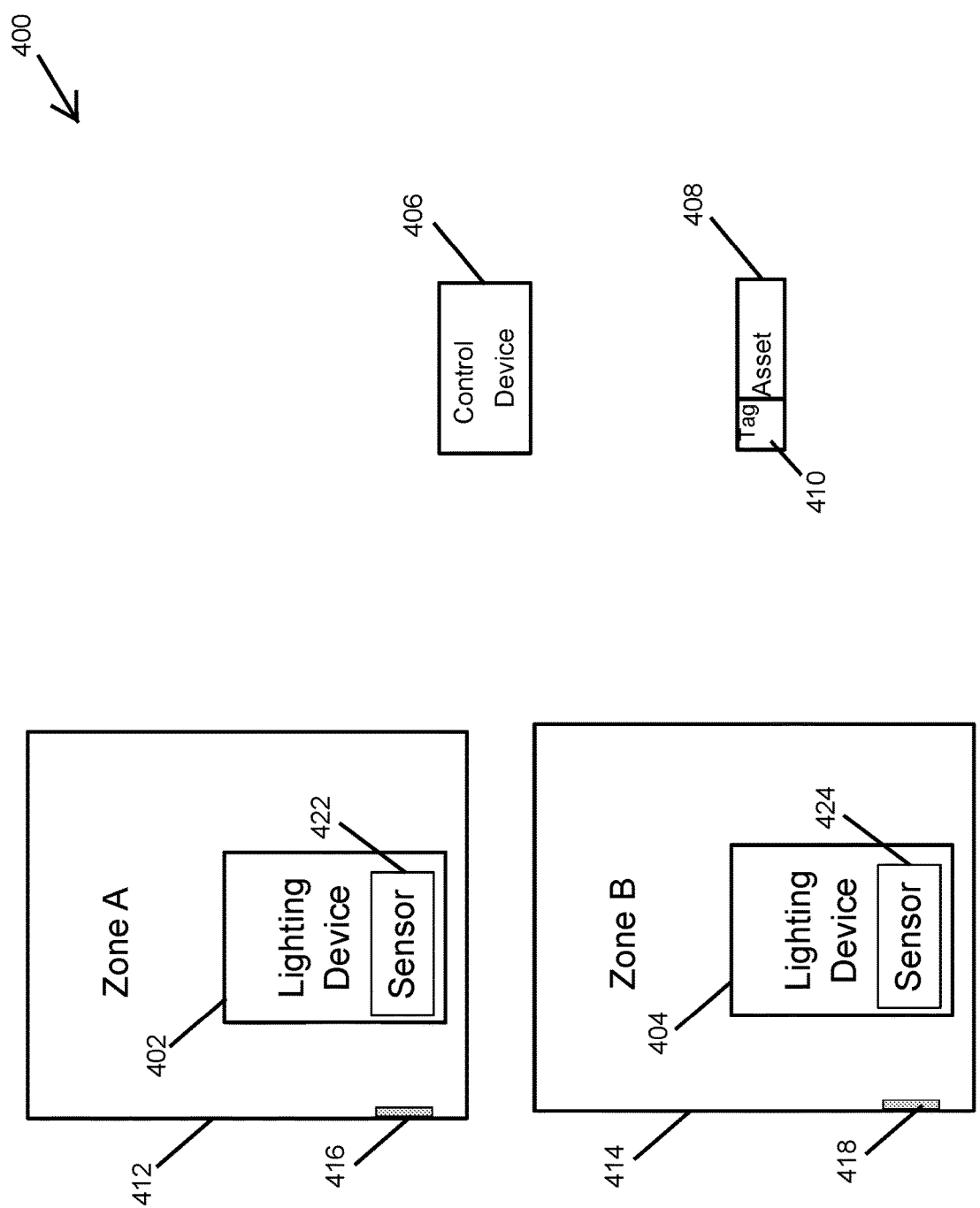
FIG. 4 illustrates a system for controlling usage of a physical asset according to an example embodiment.

FIG. 4 illustrates a system 400 for controlling usage of a physical asset 408 according to an example embodiment. In some example embodiments, the system 400 includes lighting devices 402, 404 and a control device 406. The lighting device 402 is in an area 412 labelled Zone A, and the lighting device 404 is in an area 414 labelled Zone B. In some example embodiments, the lighting devices 402 and 404 may correspond to the lighting device 102 shown in FIGS. 1-3.

In some example embodiments, a user may want to use a physical asset 408 in the areas 412, 414. For example, the physical asset 408 may be a medical device, lab equipment, an office device (e.g., a projector), etc. To illustrate, the physical asset 408 may be authorized for use in the area 412 but not in the area 414. For example, the physical asset 408 may correspond to the physical asset 104, and the asset tag 410 may correspond to the asset tag 122. If the user moves the physical asset 408 to the area 412, identification information included in a wireless beacon signal transmitted by an asset tag 410 of the physical asset 408 may be received by the lighting device 402 in the same manner as described above with respect to the lighting device 102 of FIG. 1. The lighting device 402 may wirelessly transmit the identification information received from the asset tag 410 and the location information (e.g., indicating Zone A) to the control device 406, which may correspond to the control device 106 described above.

The control device 406 may process the received identification information and location information and may determine that the physical asset 408 is authorized for use, for example, at Zone A. The control device 406 may transmit a usage control message wirelessly to the lighting device 402 indicating that the use of the physical asset 408 at Zone A is authorized. The lighting device 402 may receive the usage control message from the control device 406 and transmit the usage control message to the physical asset 408. The physical asset 408 receives the usage control message and unlocks or otherwise allows the use of the physical asset 408 by the user. For example, the physical asset 408 may make some user interface features available to the user or may provide power to components that are required for the use of the physical asset 408. Alternatively, the control device 406 may transmit the usage control message (e.g., a power control message) wirelessly to the lighting device 402 indicating that the usage of the physical asset 408 at Zone A is authorized. The lighting device 402 may receive the usage control message from the control device 406 and transmit the message to a power receptacle 416 to turn on power at the power receptacle 416 for use by the physical asset 408.

If the user moves the physical asset 408 to the area 414, the identification information wirelessly transmitted by the asset tag 410 may be received by the lighting device 404 in the same manner as described above with respect to FIG. 1. The lighting device 404 may wirelessly transmit the identification information and the location information (e.g., indicating Zone B) of the lighting device 404 to the control device 406.

The control device 406 may process the identification information and location information received from the lighting device 404 and may determine that the physical asset 408 is not authorized for use, for example, at Zone B. The control device 406 may transmit a usage control message wirelessly to the lighting device 404 indicating that the usage of the physical asset 408 at Zone B is not authorized. The lighting device 404 may receive the usage control message from the control device 406 and may transmit the message to the physical asset 408, which locks or otherwise disables use of the physical asset 408 by the user. Alternatively, the control device 406 may transmit a power control message wirelessly to the lighting device 404 indicating that the usage of the physical asset 408 at Zone B is not authorized. The lighting device 404 may receive the power control message from the control device 406 and may transmit the message to a power receptacle 418 to turn off power at the power receptacle 418 to prevent use by the physical asset 408.

In some alternative embodiments, the areas 412, 414 may have different labels or other means of identifying the locations. In some alternative embodiments, the asset 408 may be authorized for use at multiple other areas without departing from the scope of this disclosure. In some alternative embodiments, each area 412, 414 may include multiple power receptacles that can be used by the physical asset 408, and the lighting device 404 may transmit the power control message received from the control device 406 the multiple power receptacles.

Figure 5:
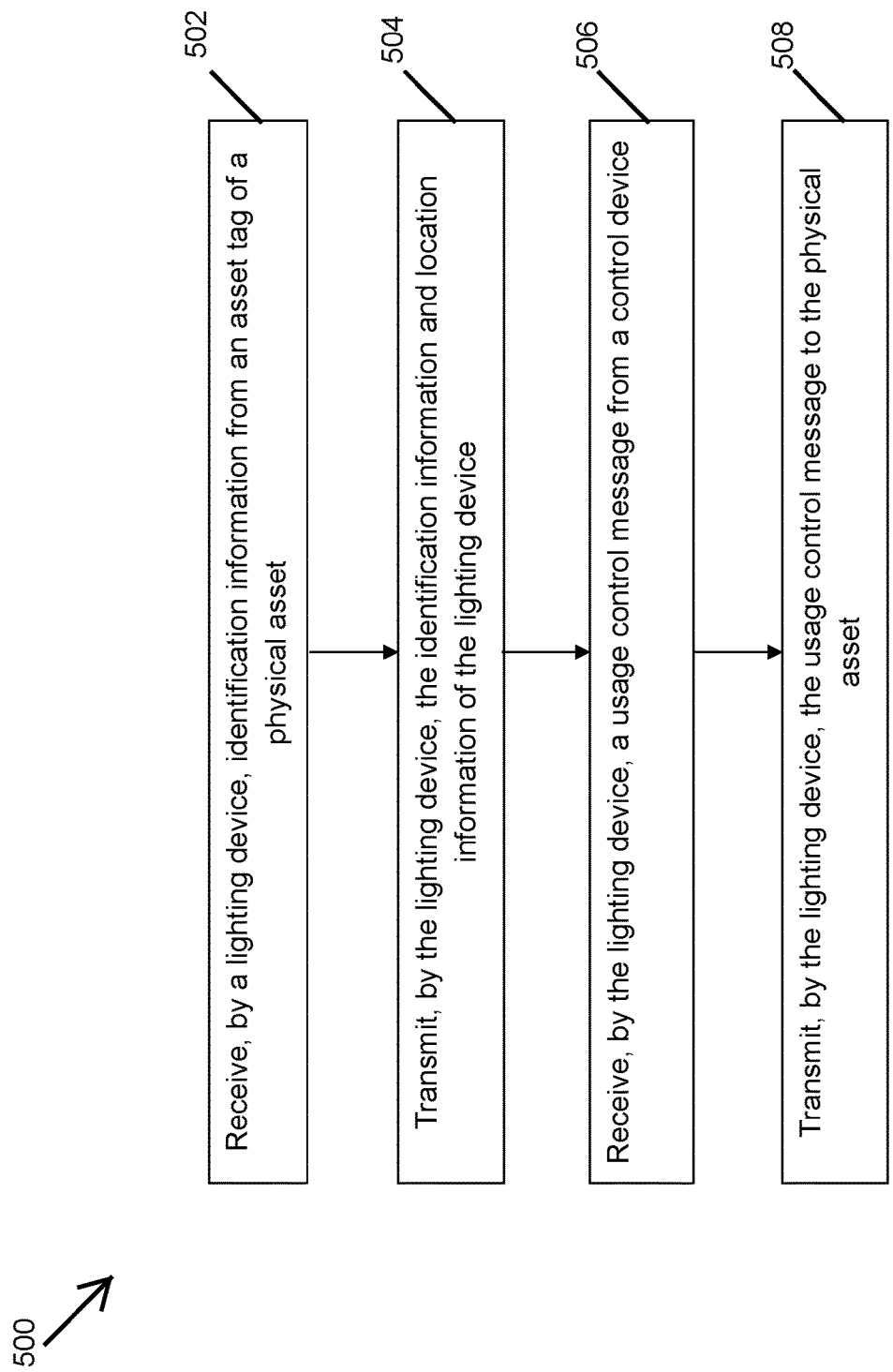
FIG. 5 illustrates a method of controlling usage of a physical asset according to an example embodiment.

FIG. 5 illustrates a method 500 of controlling usage of a physical asset according to an example embodiment. Referring to FIGS. 1 and 5, in some example embodiments, the method 500 includes receiving, by the lighting device 102, identification information from the asset tag 122 of the physical asset 104 at step 502. For example, the transceiver 114 of the lighting device 102 may receive the identification information. Alternatively, the sensor 112 of the lighting device 102 may receive the identification information. For example, the identification information may be included in a beacon signal transmitted by the asset tag 122 of the physical asset 104.

At step 504, the method 500 includes transmitting, by the lighting device 102, the identification information and location information of the lighting device 102. For example, the he transceiver 114 of the lighting device 102 may transmit the identification information and location information wirelessly to the control device 106. The location information may include a label of an area (e.g., Zone A, Room 55, etc.), location coordinates such as GPS coordinates, local positioning coordinates, and/or other information that indicates the location of the lighting device 102.

At step 506, the method 500 includes receiving, by the lighting device 500, a usage control message from the control device 106. As described above, the usage control message may indicate whether the physical asset 104 is authorized for use at the location indicated by the location information of the lighting device 102. Alternatively or in addition, the usage control message may include a command, such as a command to turn on, a command to turn off, a command to enable, a command to disable, etc., for example, the physical asset 104 or one or more components (e.g., the user interface 128, etc.) of the physical asset 104.

At step 508, the method 500 includes transmitting, by the lighting device 102, the usage control message to the physical asset 104. For example, the transceiver 114 of the lighting device 102 may transmit the usage control message to the physical asset 104 wirelessly. The physical asset 104 may receive the usage control message from the lighting device 102 and control the usage of the physical asset 104. For example, the processor 120 of the physical asset 104 may disable the user interface 128, the core components 140, and/or another component of the physical asset 104 that may be required in the use of the physical asset 104.

In some example embodiments, referring to FIGS. 1, 3, and 5, the method 500 of controlling usage of the physical asset 104 may include transmitting, by the asset tag 122 of the physical asset 104, the identification information. The method 500 may further include receiving, by the control device 106, the identification information and the location information of the lighting device 102 from the lighting device 102. The method 500 may further include processing, by the control device 106, the identification information and the location information of the lighting device 102 to determine whether the physical asset 104 associated with the identification information is authorized for use at the location indicated by the location information. The method 500 may further include transmitting, by the control device 106, a usage control message to the lighting device 102.

Although the method 500 is described herein with respect to the lighting device 102, the physical asset 104, and the control device 106, the method 500 may be implemented by or equally applicable to other lighting devices, physical assets and associated tags, and control devices without departing from the scope of this disclosure. In some example embodiments, some of the steps of the method 500 may be performed in a different order than described above. In some alternative embodiments, the method 500 may include other steps without departing from the scope of this disclosure.

Figure 6:
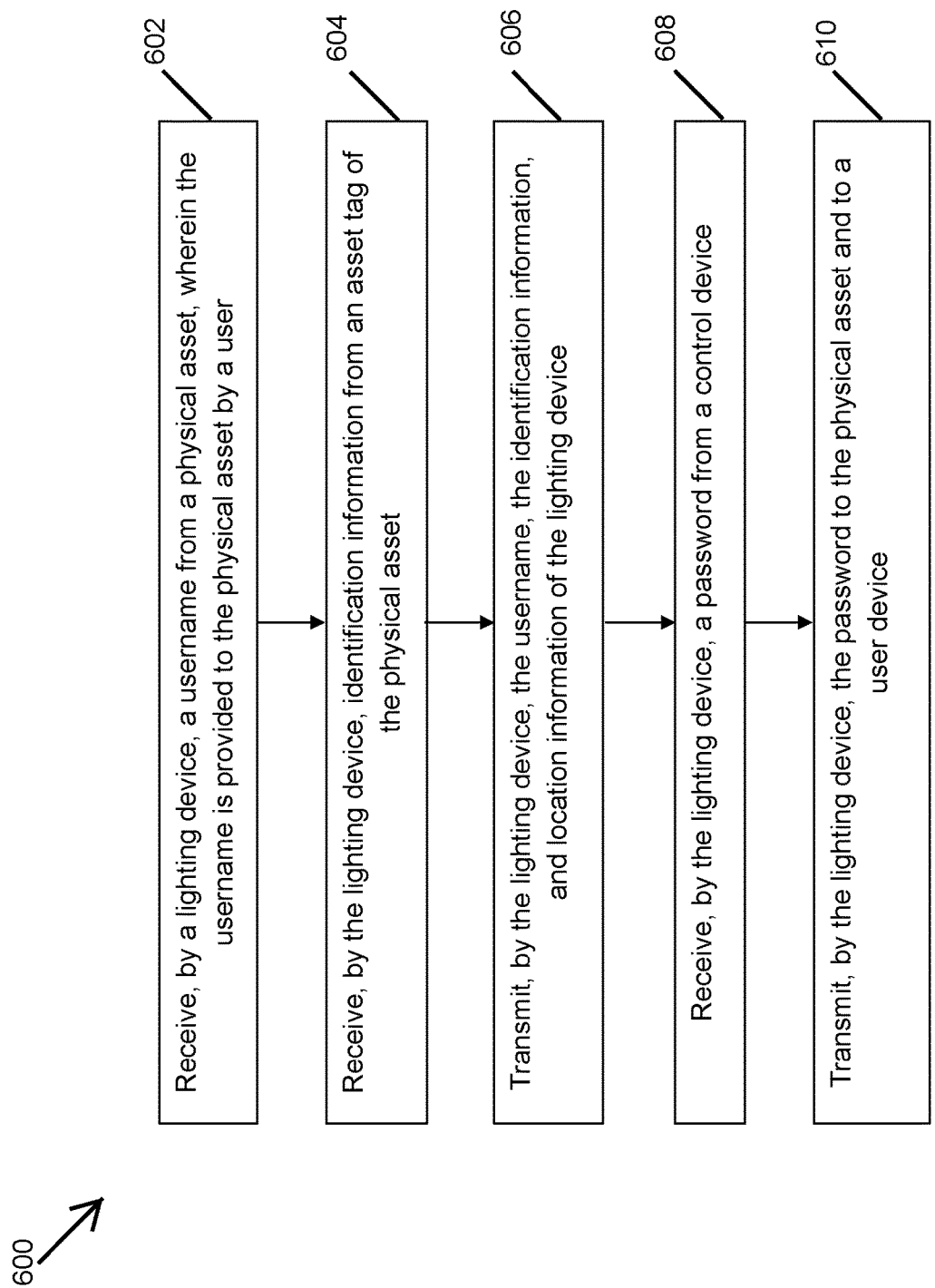
FIG. 6 illustrates a method of controlling usage of a physical asset according to another example embodiment.

FIG. 6 illustrates a method 600 of controlling usage of the physical asset 104 according to another example embodiment. Referring to FIGS. 2 and 6, in some example embodiments, the method 600 includes, at step 602, receiving, by a lighting device 102, a username from a physical asset 104, wherein the username is provided to the physical asset 204 by a user. For example, a user may enter a username or another user identifier via the user interface 128 of the physical asset 104, and the physical asset 104 may send the username/user identifier to the lighting device 102 via the transceiver 124. For example, the transceiver 124 may transmit the username/user identifier to the lighting device 102 wirelessly. In some example embodiments, along with the username/user identifier, the physical asset 104 may send to the lighting device 102 identification information of the physical asset 104 or other information that identifies the physical asset 104 via the transceiver 124.

At step 604, the method 600 includes receiving, by the lighting device 102, identification information from the asset tag 122 of the physical asset 104. For example, the transceiver 114 of the lighting device 102 may receive the identification information. Alternatively or in addition, the sensor 112 of the lighting device 102 may receive the identification information. For example, the identification information may be included in a beacon signal transmitted by the asset tag 122 of the physical asset 104. In some example embodiments, the lighting device 102 may associate the identification information received from the asset tag 122 with the username received from the physical asset, for example, based on the identification information of the physical asset 104 received along with the username.

At step 606, the method 600 includes transmitting, by the lighting device 102, the username, the identification information, and location information of the lighting device 102. The location information may include a label of an area (e.g., Zone A, Room 55, etc.), location coordinates such as GPS coordinates, local positioning coordinates, and/or other information that indicates the location of the lighting device 102. For example, the location information may be stored in the lighting device 102 (e.g., the memory device 116 of the lighting device 102) during or after installation/commissioning.

At step 608, the method 600 includes receiving, by the lighting device 102, a password from the control device 106. For example, the control device 106 may determine whether the physical asset 104 is authorized for use at the location indicated by the location information of the lighting device 102 as described above and send the password in response to determining that the physical asset 104 is authorized for use at the location of the lighting device 102 and that the username is a valid username. If the control device 106 determines that the physical asset 104 is not authorized for use at the location of the lighting device 102 or that the username is invalid, the control device 106 may send a message indicating so (e.g., to the security personnel, the physical asset 104, etc.) or may not provide any response.

At step 610, the method 600 includes transmitting, by the lighting device 102, the password to the physical asset 104 and to a user device 202. For example, the lighting device 102 may transmit the password to the user device 202 using wireless signals compliant with a communication standard, such as Wi-Fi, BLE, etc. To illustrate, the control device 106 may transmit the password along with a user device identifier (e.g., network id, device name, etc.) that can be used by the lighting device 102 to transmit the password to the user device 202. When the user provides the received password to the physical asset 104 (e.g., via the user interface 128), the physical asset 104 (e.g., the processor 120) may verify that the user-entered password matches the password received by the physical asset 104 from the lighting device 102. The physical asset 104 may enable its use if the user-entered password matches the password received by the physical asset 104 from the lighting device 102. If the user-entered password does not match the password received by the physical asset 104 from the lighting device 102, the physical asset 104 (e.g., the processor 120) may disable or power off the user interface 128, the core components 140, and/or components that are required for the use of the physical asset 104.

Although the method 600 is described herein with respect to the lighting device 102, the physical asset 104, and the control device 106, the method 600 may be implemented by or equally applicable to other lighting devices, physical assets and associated tags, and control devices without departing from the scope of this disclosure. In some example embodiments, some of the steps of the method 600 may be performed in a different order than described above. In some alternative embodiments, the method 600 may include other steps without departing from the scope of this disclosure.

Figure 7:
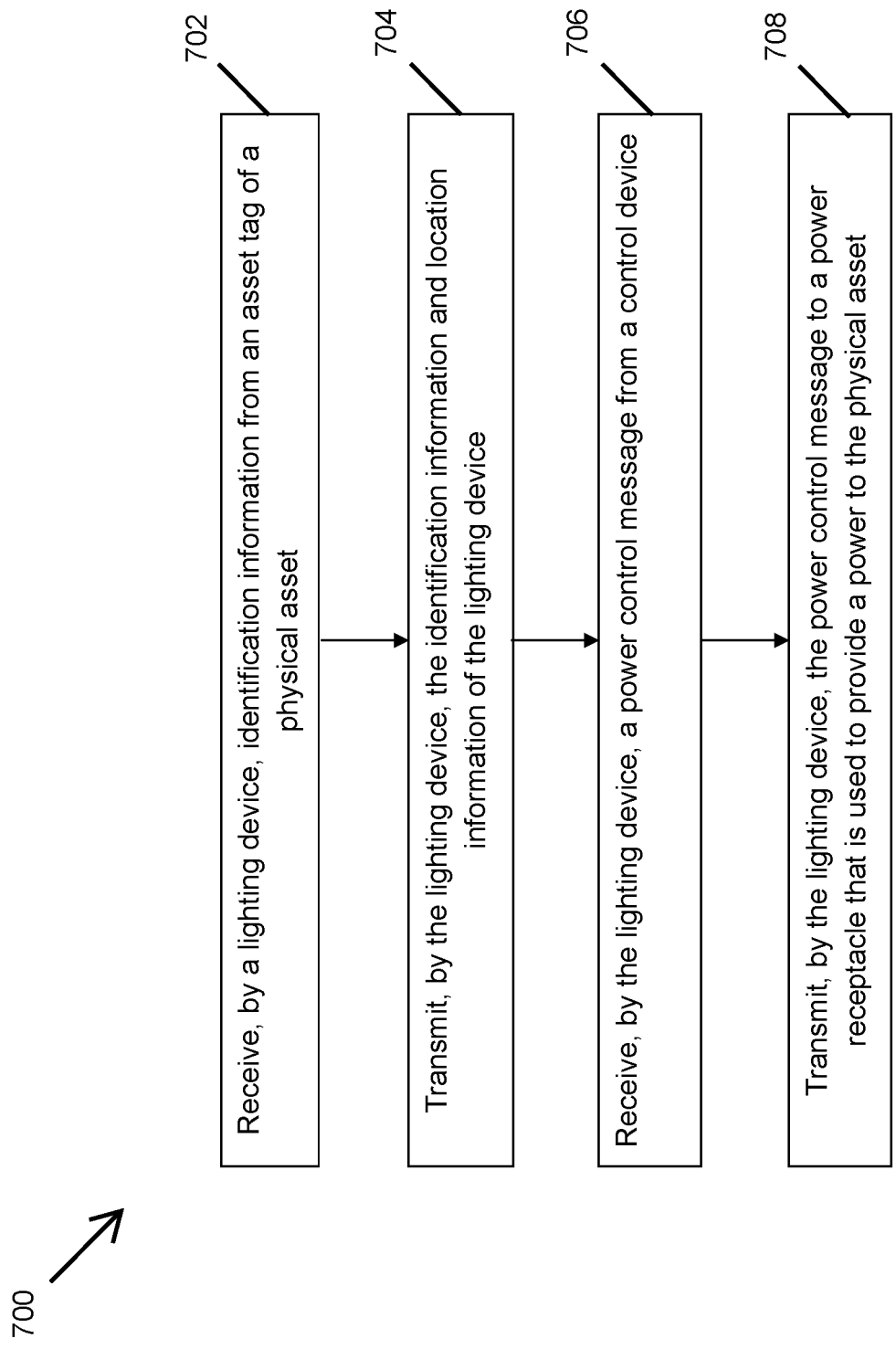
FIG. 7 illustrates a method of controlling usage of a physical asset according to another example embodiment.

FIG. 7 illustrates a method 700 of controlling usage of the physical asset 104 according to another example embodiment. Referring to FIGS. 1 and 7, in some example embodiments, the method 700 includes receiving, by the lighting device 102, identification information from the asset tag 122 of the physical asset 104 at step 702. For example, the transceiver 114 of the lighting device 102 may receive the identification information. Alternatively, the sensor 112 of the lighting device 102 may receive the identification information. For example, the identification information may be included in a beacon signal transmitted by the asset tag 122 of the physical asset 104.

At step 704, the method 700 includes transmitting, by the lighting device 102, the identification information and location information of the lighting device 102. For example, the he transceiver 114 of the lighting device 102 may transmit the identification information and location information wirelessly to the control device 106. The location information may include a label of an area (e.g., Zone A, Room 55, etc.), location coordinates such as GPS coordinates, local positioning coordinates, and/or other information that indicates the location of the lighting device 102.

At step 706, the method 700 includes receiving, by the lighting device 700, usage control message (e.g., a power control message) from the control device 106. As described above, the usage control message may indicate whether the physical asset 104 is authorized for use at the location indicated by the location information of the lighting device 102. Alternatively or in addition, the usage control message may include a command, such as a command to turn on, a command to turn off, a command to enable, a command to disable, etc., for example, the physical asset 104 or one or more components (e.g., the user interface 128, etc.) of the physical asset 104.

At step 708, the method 700 includes transmitting, by the lighting device 102, the usage control message to the power receptacle 302 that can be used to provide power to the physical asset 104. For example, each power receptacle 302 may include a relay that can be controlled to control the availability of power to the physical asset 104 at the power receptacle 302.

In some example embodiments, referring to FIGS. 1, 3, and 5, the method 700 of controlling usage of the physical asset 104 may include transmitting the identification information by the asset tag 122 of the physical asset 104. The method 700 may further include receiving, by the control device 106, the identification information and the location information of the lighting device 102 from the lighting device 102. The method 700 may further include processing, by the control device 106, the identification information and the location information of the lighting device 102 to determine whether the physical asset 104 associated with the identification information is authorized for use at the location indicated by the location information. The method 700 may further include transmitting, by the control device 106, a usage control message to the lighting device 102.

Although the method 700 is described herein with respect to the lighting device 102, the physical asset 104, and the control device 106, the method 700 may be implemented by or equally applicable to other lighting devices, physical assets and associated tags, and control devices without departing from the scope of this disclosure. In some example embodiments, some of the steps of the method 700 may be performed in a different order than described above. In some alternative embodiments, the method 700 may include other steps without departing from the scope of this disclosure.

In some alternative embodiments, the method 700 may include other steps, and some of the steps of the method 700 may be performed in a different order than described above.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A lighting device, comprising:
   a light source configured to emit a light in a first area;
   a sensor configured to receive identification information from an asset tag of a physical asset, wherein the identification information includes a user identifier associated with a user and asset identification data associated with the physical asset, wherein the physical asset is moveable from the first area to a second area; and
   a processor configured to send the identification information received from the asset tag and location information of the lighting device to a control device, wherein the processor is further configured to receive a usage control message from the control device and when the physical asset is located in the first area, transmit the usage control message, wherein the usage control message includes a password sent to a user device, and wherein the usage control message is used to authorize the physical asset as available for use by the user based, at least in part, on, the asset identification data associated with the physical asset, and the location information of the lighting device received by the control device, and the password sent to the user device.

2. The lighting device of claim 1, wherein the sensor is configured to wirelessly receive a beacon signal that includes the identification information.

3. The lighting device of claim 1, wherein the processor is configured to send the usage control message to the physical asset.

4. The lighting device of claim 1, wherein the processor is configured to send the usage control message to a power receptacle located at a location indicated by the location information and wherein the usage control message controls availability of power at the power receptacle.

5. The lighting device of claim 1, wherein usage control message includes a command to enable or disable the physical asset.

6. The lighting device of claim 1, wherein the processor is configured to send the identification information and the location information of the lighting device via a transceiver of the lighting device configured to wirelessly transmit the identification information and the location information of the lighting device.

7. The lighting device of claim 1, wherein the location information of the lighting device is stored in the lighting device.

8. The lighting device of claim 1, wherein the location information of the lighting device includes a label of an area.

9. The lighting device of claim 1, wherein the location information of the lighting device includes location coordinates.

10. The lighting device of claim 1, wherein the usage control message includes a password associated with the user to authorize the use of the physical asset by the user.

11. A non-transitory computer-readable medium containing instructions executable by a processor, the instructions comprising:
    receiving identification information from an asset tag of a physical asset, wherein the identification information includes a user identifier associated with a user and asset identification data associated with the physical asset, wherein the physical asset is moveable from a first area to a second area;
    sending location information of a lighting device located in the first area and the identification information to a control device;
    receiving a usage control message from the control device; and
    when the physical asset is located in the first area, sending the usage control message, wherein the usage control message includes a password sent to a user device, and wherein the usage control message is used to authorize the physical asset as available for use by the user based, at least in part, on the asset identification data associated with the physical asset and the location information of the lighting device received by the control device, and the password sent to the user device.

12. The non-transitory computer-readable medium of claim 11, wherein sending the usage control message comprises sending the usage control message to the physical asset.

13. The non-transitory computer-readable medium of claim 11, wherein sending the usage control message comprises sending the usage control message to a power receptacle located at a location indicated by the location information.

14. The non-transitory computer-readable medium of claim 11, wherein the location information of the lighting device is stored in the lighting device.

15. The non-transitory computer-readable medium of claim 11, wherein the location information of the lighting device includes a label of an area.

16. A system for controlling usage of a physical asset, the system comprising:
- a lighting device located in a first area configured to:
    - transmit to a control device location information of the lighting device and identification information received from an asset tag of a physical asset, wherein the identification information includes a user identifier associated with a user and asset identification data associated with the physical asset, wherein the physical asset is moveable from a first area to a second area; and
    - when the physical asset is located in the first area transmit a usage control message received from the control device; and
- a control device configured to transmit to the lighting device the usage control message generated based on the identification information and the location information, wherein the usage control message includes a password sent to a user device, and wherein the usage control message is used to authorize the physical asset as available for use by the user based, at least in part, on the asset identification data associated with the physical asset and the location information of the lighting device received by the control device, and the password sent to the user device.

17. The system of claim 16, wherein the lighting device comprises a sensor configured to wirelessly receive a beacon signal that includes the identification information.

18. The system of claim 16, wherein the physical asset is configured to receive the usage control message from the lighting device and to control whether the physical asset is enabled for use based on the usage control message.

19. The system of claim 16, further comprising a power receptacle located at a location indicated by the location information and configured to receive the usage control message from the lighting device, wherein availability of power at the power receptacle is controlled based on the usage control message.

20. The system of claim 16, wherein the location information of the lighting device is stored in the lighting device.

* * * * *